(12) United States Patent
Fenger et al.

(10) Patent No.: US 12,215,000 B2
(45) Date of Patent: Feb. 4, 2025

(54) METHOD AND YOKE FOR LIFTING A WIND TURBINE COMPONENT

(71) Applicant: LIFTRA IP APS, Aalborg SV (DK)

(72) Inventors: Per E. Fenger, Terndrup (DK); Alexander Becsei Christiansen, Hjørring (DK)

(73) Assignee: LIFTRA IP APS, Aalborg (DK)

( * ) Notice: Subject to any disclaimer, the term of this patent is extended or adjusted under 35 U.S.C. 154(b) by 0 days.

(21) Appl. No.: 17/777,782

(22) PCT Filed: Jun. 18, 2020

(86) PCT No.: PCT/DK2020/050176
§ 371 (c)(1),
(2) Date: May 18, 2022

(87) PCT Pub. No.: WO2020/259771
PCT Pub. Date: Dec. 30, 2020

(65) Prior Publication Data
US 2023/0079878 A1 Mar. 16, 2023

(30) Foreign Application Priority Data
Jun. 24, 2019 (DK) .............. PA201970397

(51) Int. Cl.
*B66C 13/46* (2006.01)
*B66C 1/10* (2006.01)
*B66C 1/42* (2006.01)
*B66C 1/62* (2006.01)
*F03D 13/10* (2016.01)

(52) U.S. Cl.
CPC .............. *B66C 13/46* (2013.01); *B66C 1/108* (2013.01); *B66C 1/42* (2013.01); *B66C 1/62* (2013.01); *F03D 13/10* (2016.05); *F05B 2230/61* (2013.01)

(58) Field of Classification Search
CPC ......... B66C 13/46; B66C 13/08; B66C 1/108; B66C 1/42; B66C 1/62; F03D 13/10; F03D 13/40; F05B 2230/61
See application file for complete search history.

(56) References Cited

FOREIGN PATENT DOCUMENTS

| DE | 102009005632 A1 | 7/2010 |
|---|---|---|
| DK | 201870586 A1 | 6/2020 |
| EP | 2345811 A1 | 7/2011 |
| EP | 2369174 A1 | 9/2011 |
| EP | 2873641 A1 | 5/2015 |
| EP | 2924278 A1 | 9/2015 |

(Continued)

*Primary Examiner* — Moshe Wilensky
(74) *Attorney, Agent, or Firm* — Bookoff McAndrews, PLLC

(57) ABSTRACT

The present invention relates to a method for lifting a wind turbine component, such as a rotor blade, gearbox or a rotor, with a lifting yoke comprising
 a first structural body comprising a crane hook attachment point, a first connection point and a second connection point,
 a second structural body comprising a third connection point and a fourth connection point, the second structural body further comprising a first axis defined as being parallel to the longitudinal direction of the second structural body, a second axis defined as being perpendicular to the first axis and extending substantially in the transverse direction of the second structural body, said first and second axis defining a lifting plane, and a third axis defined as being perpendicular to the first and second axes.

19 Claims, 11 Drawing Sheets

(56) References Cited

FOREIGN PATENT DOCUMENTS

| WO | WO 2012/095112 A1 | 7/2012 |
| WO | WO 2018/041313 A1 | 3/2018 |
| WO | WO 2018/113868 A1 | 6/2018 |

Fig. 3a
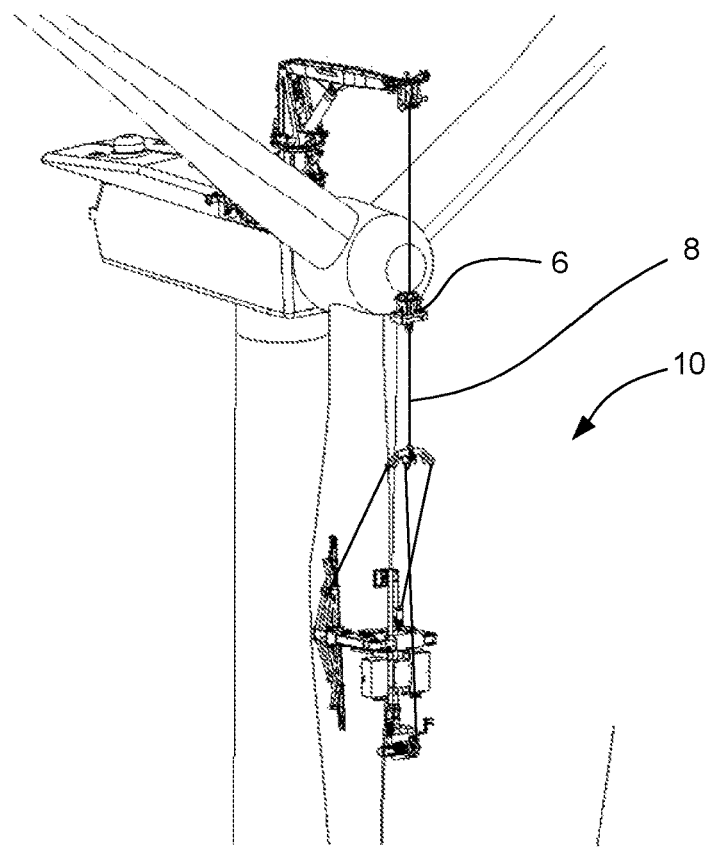
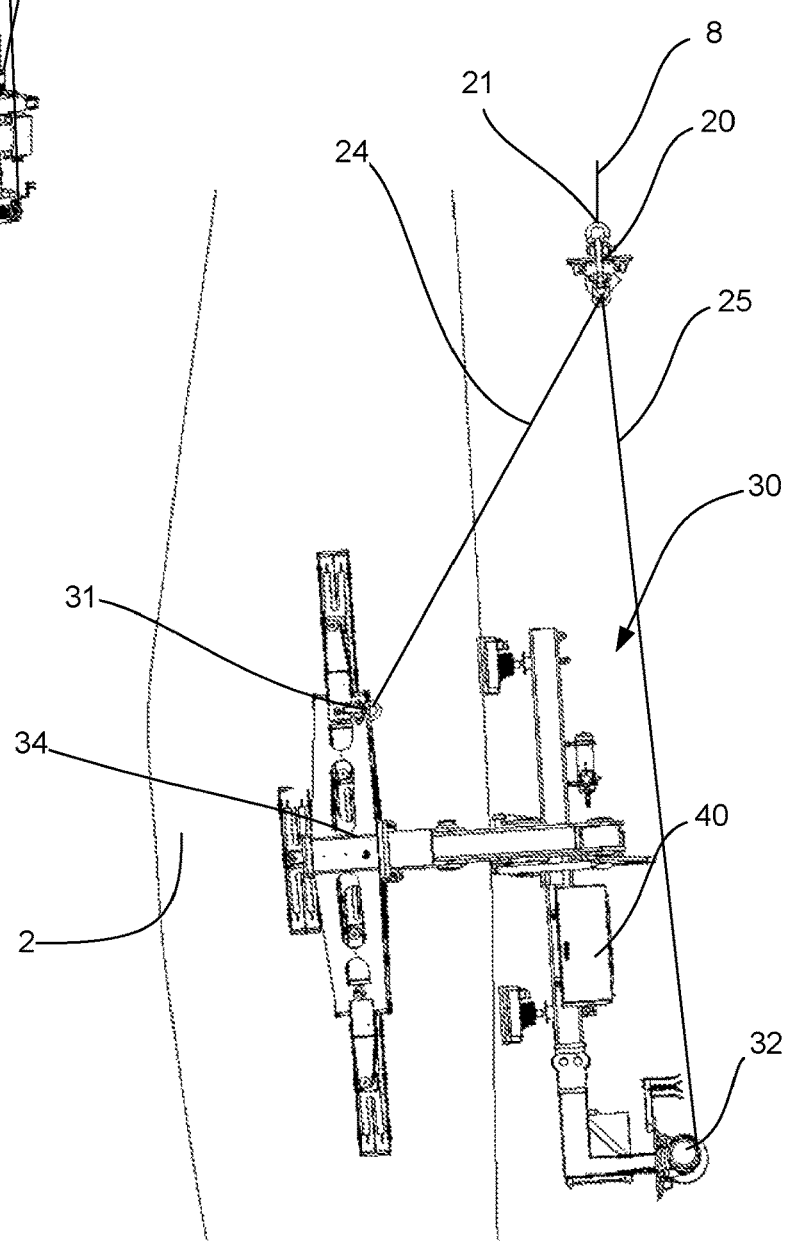
Fig. 3b

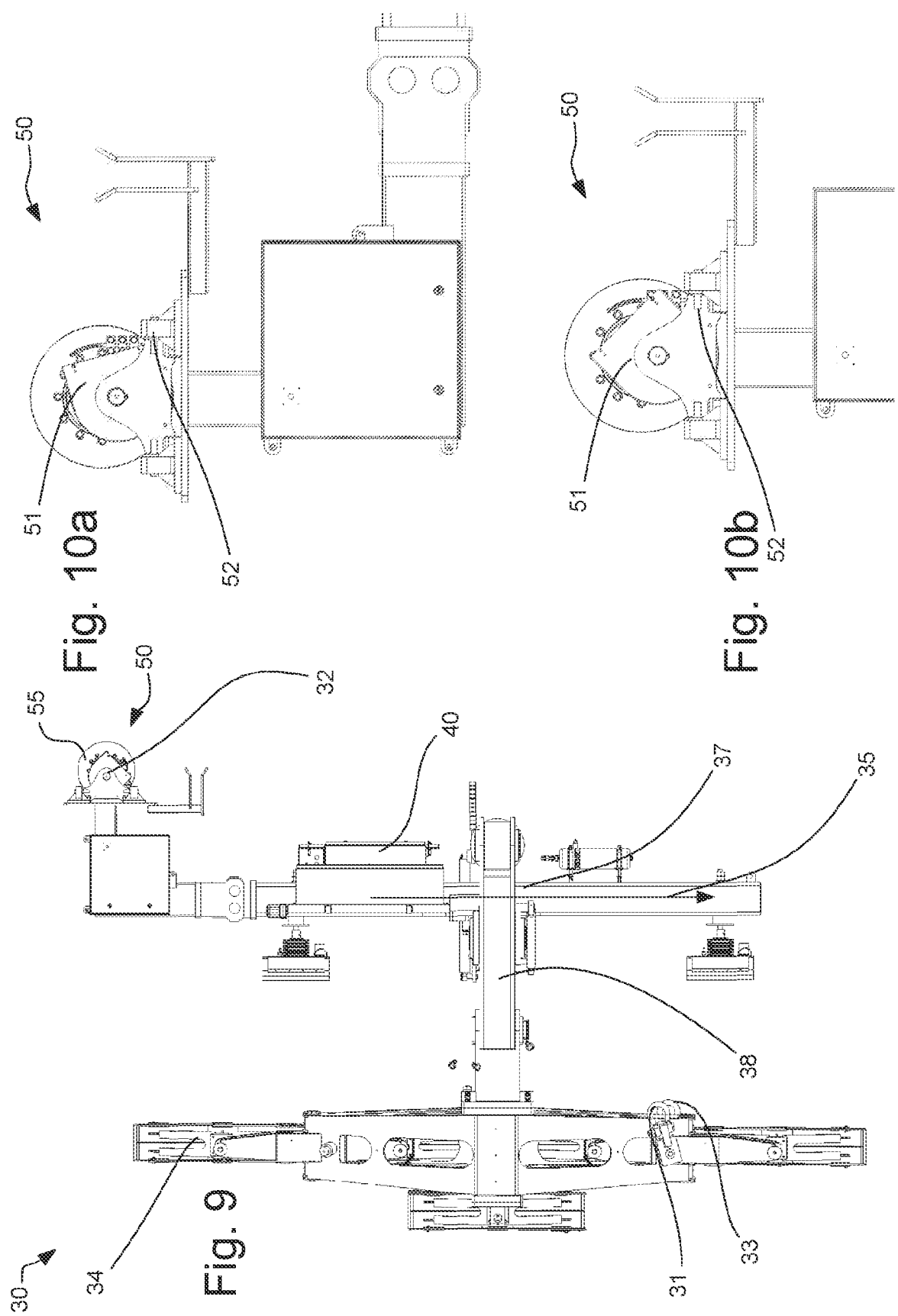

METHOD AND YOKE FOR LIFTING A WIND TURBINE COMPONENT

BACKGROUND OF THE INVENTION

Field of the Invention

The present invention relates to a method for lifting a wind turbine component, such as a rotor blade, gearbox or a rotor, with a lifting yoke comprising a first structural body comprising a crane hook attachment point, a first connection point and a second connection point, a second structural body comprising a third connection point and a fourth connection point, the second structural body further comprising a first axis defined as being parallel to the longitudinal direction of the second structural body, a second axis defined as being perpendicular to the first axis and extending substantially in the transverse direction of the second structural body, said first and second axis defining a lifting plane, and a third axis defined as being perpendicular to the first and second axes.

Description of Related Art

In the field of installing and servicing wind turbines, large components are often lifted by crane. However, many of these components, such as a wind turbine rotor blade, are optimized to reduce the weight, while providing the needed stiffness to operate. As such, when manufacturing wind turbine rotor blades there is a lesser focus on the geometric position of the center of gravity of the blade, in order to allow for an optimal build of the specific blade. When wind turbines have been installed and after the have operated for a period of time, they will often need to be serviced, and sometimes the wind turbine rotor blades need to be replaced.

When replacing them it is important to lift the blade in a controlled manner, and as such it is often desired to lift the blade near the center of gravity. An example of such is Liftra's C-yoke (DK201870586, not yet published) where a small, weight optimized yoke can handle even very large blades, when lifting at the center of gravity. However, when removing wind turbine rotor blades from the rotor, the position of the center of gravity of the blade is rarely known. As such, it is often required to provide a larger than needed lifting yoke, in order to compensate for the uncertainties in the location of the center of gravity of the blade.

SUMMARY OF THE INVENTION

The object of the present invention is therefore to provide a method for lifting a wind turbine component, wherein the center of gravity of the wind turbine component can be calculated relative to the position of the lifting yoke.

In view of this object, the inventive concept provides a method for lifting a wind turbine component, such as a rotor blade, gearbox or a rotor, with a lifting yoke comprising
- a first structural body comprising a crane hook attachment point, a first connection point and a second connection point,
- a second structural body comprising a third connection point and a fourth connection point, the second structural body further comprising a first axis defined as being parallel to the longitudinal direction of the second structural body, a second axis defined as being perpendicular to the first axis and extending substantially in the transverse direction of the second structural body, said first and second axes defining a lifting plane, and a third axis defined as being perpendicular to the first and second axes,
- a first tensional element, such as a sling or a wire, said first tensional element connecting the first connection point and the third connection point,
- a second tensional element, such as a sling or a wire, said second tensional element connecting the second connection point and the fourth connection point, and wherein the length of the second tensional element is variable, such that the angle between the first and second structural bodies can be changed, by changing the length of the second tensional element, and
- an inertial measurement unit positioned on the second structural body, wherein the method comprises the steps of:
a) attaching a crane hook to the crane hook attachment point,
b) attaching the wind turbine component to the second structural body of the lifting yoke,
c) measuring at least one angle of rotation of the lifting plane about at least one of the first and/or second axis with respect to the horizontal plane using the inertial measurement unit,
d) determining the distance, along at least one axis in the lifting plane perpendicular to the first and/or second axis about which the angle of rotation of the lifting plane, from the fourth connection point on the second structural body to the intersection between an axis extending vertically through the center of gravity of the wind turbine component and the lifting plane, and
e) providing the distance, along at least one axis in the lifting plane perpendicular to the first and/or second axis about which the angle of rotation of the lifting plane, from the fourth connection point on the second structural body to the intersection between an axis extending vertically through the center of gravity of the wind turbine component and the lifting plane to a crane operator.

A method of this type is advantageous as it will provide information about the center of gravity of the wind turbine component in very early stages of the lift. Therefore, the crane operator can place the wind turbine component in a stationary position connected to the wind turbine, in order to re-position the second structural body of the lifting yoke according to the information provided by the method in step e), more specifically the distance along at least one axis in the lifting plane perpendicular to the first and/or second axis about which the angle of rotation of the lifting plane was measured, from the fourth connection point on the second structural body to the intersection between an axis extending vertically through the center of gravity of the wind turbine component and the lifting plane, such as to attach the second structural body in a position where the crane hook connection point can be positioned substantially vertically above the center of gravity of the wind turbine component, when the wind turbine component is lowered from the top of the wind turbine to the ground or vice versa.

In this embodiment, when the angle of rotation of the lifting plane about the first axis is measured in step c), the axis along which the distance is determined in step d) is the second axis.

Likewise, when the angle of rotation of the lifting plane about the second axis is measured in step c), the axis along which the distance is determined in step d) is the first axis.

In a specific embodiment according to the inventive concept, a wind turbine rotor blade lifting yoke is provided for using the method according to the inventive concept specifically for determining the center of gravity of a wind turbine rotor blade.

This is advantageous as wind turbine rotor blades are especially difficult to determine the center of gravity of, and have a very elongated shape, which means that when the length of the second tensional element is changed, the position of the center of gravity of the wind turbine rotor blade is shifted by a large distance relative to the lifting yoke.

In an embodiment according to the invention, the second structural body further comprises a fifth connection point, wherein a third tensional element, such as a sling or a wire, connects the first connection point and the fifth connection point.

This is particularly advantageous, when the wind turbine to be lifted is of a type, which is sensitive to movement, external loading, etc. such as a wind turbine rotor blade. This is because a third tensional element, will add to the stability of the lifting yoke, especially if the fifth connection point is not located on a line extending through the third and fourth connection points.

In a second embodiment according to the invention the method further comprises the steps of:
  a) c') determining the tension in the second tensional element,
  b) c") comparing the information regarding the at least one angle of rotation of the lifting plane and the tension in the second tensional element to a pre-configured look-up table, wherein said pre-configured look-up table contains information regarding the distance, along an axis in the lifting plane perpendicular to the axis about which the angle of rotation of the lifting plane was measured, from the fourth connection point on the second structural body to the intersection between an axis extending vertically through the center of gravity of the wind turbine component and the lifting plane for a plurality of sets of at least one angle of rotation of the lifting plane and tension in the second tensional element.

This is advantageous when the method is applied to a wind turbine component, which is well known, such that a pre-configured look-up table can be generated. This is particularly advantageous as it reduces the number of sensors and computational capacity required in the lifting yoke.

In another embodiment according to the inventive concept, the method further comprises the steps of:
  a) d') determining the angle between the second tensional element and the first axis of the second structural body
  b) d") determining the length of the second tensional element between the second connection point and the fourth connection point,
  c) using the angle between the second tensional element and the first axis of the second structural body and the length of the second tensional element between the second connection point and the fourth connection point for determining the distance along the first axis of the second structural body from a point on the lifting yoke to the center of gravity of the wind turbine component.

This is advantageous as it is possible to determine the distance, along at least the first axis in the lifting plane from the fourth connection point on the second structural body to the intersection between an axis extending vertically through the center of gravity of the wind turbine component and the lifting plane when an angle of rotation of the lifting plane about the second axis of the second structural body with respect to the horizontal plane, the angle between the first axis of the second structural body and the length of the second tensional element are known.

In a further embodiment according to the invention, the method further comprises the step of
  a) d''') determining the angle between the second tensional element and the second axis of the second structural body.

This is advantageous as it is possible to further determine the distance along the second axis of the second structural body from the fourth connection point to the to the intersection between an axis extending vertically through the center of gravity of the wind turbine component and the lifting plane.

In yet another embodiment according to the invention the step of determining the angle between the second tensional element and the first axis of the second structural body further comprises the steps of
  a) measuring a first force component in the second tensional element, said first force component having a predetermined direction with relation to the lifting plane,
  b) measuring a second force component in the second tensional element, said second force component having a predetermined direction with relation to the lifting plane, said direction of the second force component is not parallel with the direction of the first force component,
  c) calculating the directional vector from the size of the first and second force components,
  d) calculating the angle between the directional vector and the first axis of the second structural body.

It is advantageous to use a force measuring device to determine the angle between the second tensional element and the first axis of the second structural body, as lifting yokes of this type will often comprise force measuring components, such as load cells or load pin, which are used for safety reasons to ensure that the second tensional element is not loaded beyond its structural limits. By determining the angle in this way, an additional angle sensor can be saved, thus reducing the cost of implementation of the invention.

In a further embodiment according to the invention, the first force component is substantially perpendicular to the lifting plane, and the second force component is substantially parallel to the first axis of the second structural body.

In yet another embodiment according to the invention, the step of determining the angle between the second tensional element and the second axis of the second structural body further comprises the steps of
  a) measuring a first force component in the second tensional element, said first force component being substantially perpendicular to the lifting plane,
  b) measuring a third force component in the second tensional element, said third force component being substantially parallel to the second axis of the second structural body,
  c) calculating the directional vector from the size of the first and third force components,
  d) calculating the angle between the directional vector and the second axis of the second structural body.

By using a sensor of this type, the angle between the second tensional element and both of the first and second axes of the second structural body can be calculated.

In another embodiment according to the invention, the step of determining the angle between the second tensional element and the first axis of the second structural body further comprises the steps of
 a) measuring the angle of an exit sheave axis of an exit sheave, said exit sheave being connected to the second tensional element in a position between the second connection point and the fourth connection point, wherein said exit sheave is connected to the second structural body and wherein the exit sheave axis is parallel with the second tensional element between the second connection point and the fourth connection point.

This is advantageous when a force measuring component is not available, or when an inexpensive angle sensor can be implemented on the exit sheave. It is further possible to use an angle measurement of this type to add a second level of security in the determination of the distance, along at least one axis in the lifting plane perpendicular to the first and/or second axis about which the angle of rotation of the lifting plane was measured, from the fourth connection point on the second structural body to the intersection between an axis extending vertically through the center of gravity of the wind turbine component and the lifting plane.

In another embodiment according to the invention wherein the method further comprises:
 a) adding the information about the angle of rotation of the second structural body about at least the second axis and the angle between the second tensional element and the first axis of the second structural body,
 b) d"") determining the horizontal distance from the fourth connection point of the second structural body to a point on the wind turbine component intersecting with a vertical axis extending from the second connection point of the first structural body,
 c) using the information about the angle of rotation of the second structural body about at least the second axis to determine the distance along at least the first axis of the second structural body from the fourth connection point of the second structural body to the point on the wind turbine component intersecting with a vertical axis extending from the second connection point of the first structural body.

In yet another embodiment of the invention, the method further comprises that:
 a) during step d""), the method further comprises the steps of:
 b) using information about a predetermined horizontal distance from the crane hook attachment point to the second connection point of the first structural body to determine an offset value in the direction along the first axis of the second structural body,
 c) adding the offset value to the horizontal distance determined in step d""), and
 d) using the information about the angle of rotation of the second structural body about at least the second axis to determine the distance along at least the first axis of the second structural body from the second connection point of the second structural body to the point on the wind turbine component intersecting with a vertical axis extending from the second connection point of the first structural body.

This is advantageous in embodiments where the first and second connection points of the first structural body are not located on a vertical line with the crane hook connection point.

In yet another embodiment according to the inventive concept the method further comprises that during steps c) to d) the second structural element is held in a first position, and wherein, after providing information to the crane operator in step e), the method further comprises the step f) wherein the second structural element is moved to a second position, by changing the length of the second tensional element between the second and fourth connection points, and step g) wherein the crane operator lowers or raises the crane hook and the attached lifting yoke.

It is particularly advantageous to use a method according to this embodiment when the wind turbine component has a shape, where it will be rotated during lowering or raising of the wind turbine component. One example of such would be when lifting a wind turbine rotor blade, which is moved between a substantially vertical position near the top of the wind turbine and a substantially horizontal position during lowering/raising of the wind turbine rotor blade. It is therefore very advantageous to use a lifting method according to the inventive concept, as the position of the center of gravity of the wind turbine rotor blade relative to the fourth connection point of the second structural body, and therefore to any point of the well-defined second structural body, is determined and provided to the crane operator. Thus, the crane operator can determine, based on the information regarding the relative position of the center of gravity with respect to the second structural body while the second structural body is in its first position, whether or not it is safe to rotate the wind turbine rotor blade from a substantially vertical orientation to a substantially horizontal position.

In a further embodiment according to the previous embodiment of the invention the method comprises the steps of comparing the at least one distance provided in step e) to a pre-determined range, and:
 a) if the at least one distance provided in step e) is outside the pre-determined range the second structural element is either repositioned relative to the wind turbine component after step e), or
 b) if the at least one distance provided in step e) is within the pre-determined range, then step f) is performed.

This is advantageous as the wind turbine component can be reattached to the wind turbine, if it is not safe to rotate the wind turbine component. As such, by using the method according to the embodiment, the crane operator can attach the lifting yoke, particularly the second structural body, to the wind turbine rotor blade attached to the rotor hub of the wind turbine, and after detaching the wind turbine rotor blade from the rotor hub determine if the wind turbine rotor blade can safely be rotated to a horizontal orientation. If the crane operator determines that it would not be safe, by comparing the at least one distance provided in step e) to a pre-determined range, the crane operator can ensure that the wind turbine rotor blade is reattached to the rotor hub. Following this, the second structural body can be moved to a new position on the wind turbine rotor blade corresponding to a distance calculated as the difference between the determined the at least one distance provided in step e) and the desired distance, along the at least one axis in the lifting plane perpendicular to the first or second axis about which the angle of rotation of the lifting plane was measured, from the fourth connection point on the second structural body to the intersection between an axis extending vertically through the center of gravity of the wind turbine component and the lifting plane. By doing this, in theory, the center of gravity will now be located in the desired position relative to the second structural body. However, for confirmation, the wind turbine rotor blade can be detached from the rotor hub and the method according to the inventive concept can be performed again, to confirm that the wind turbine rotor blade is in the desired position prior to moving the second structural body from its first position to its second position.

In a second aspect of the invention a wind turbine rotor blade lifting yoke is provided, the lifting yoke comprising
- a) a first structural body comprising a crane hook connection point configured to attach to the hook of a crane,
- b) a second structural body located at a distance from the first structural body,
- c) a first tensional element, such as a sling or a wire, said first tensional element connecting a first connection point of the first structural body and a third connection point of the second structural body,
- d) a second tensional element, such as a sling or a wire, said second tensional element connecting a second connection point of the first structural body and a fourth connection point of the second structural body, and wherein the length of the second tensional element is variable, such that the angle between the first and second structural bodies can be changed, by changing the length of the second tensional element,
- e) an inertial measurement unit positioned on the second structural body,
- f) wherein the inertial measurement unit measures the angle of rotation of the second structural body about at least one axis with respect to the horizontal and/or vertical direction,
- g) a sensor, which measures information that can be used to calculate the length of the second tensional element, such as an encoder, a positional transducer, a hall effect sensor system,
- h) a sensor, which measures information that can be used to calculate an angle of the second tensional element with respect to the second structural body,
- i) a control system which, when provided with the measurements of the sensors, calculates the center of gravity of the wind turbine component.

A lifting yoke of this type is advantageous as it allows for high maneuverability of the wind turbine rotor blade in the lifting yoke, and is especially for using with the method according to the first aspect of the invention, when the position of the wind turbine rotor blade center of gravity is not well known.

In a further embodiment of the second aspect of the invention, the sensor, which measures information that can be used to calculate an angle of the second tensional element with respect to the second structural body is a load pin, which measures the force in the fourth connection point in at least two directions not being parallel with each other, and wherein the angle of the second tensional element with respect to the second structural body can be calculated by the two force vector provided by the load pin.

The invention will now be explained in more detail below by means of examples of embodiments with reference to the accompanying drawings.

BRIEF DESCRIPTION OF THE DRAWINGS

FIG. 3a is a perspective view of a lifting yoke according to an embodiment of the invention, which has been attached to the wind turbine rotor blade according to an embodiment of the invention, FIG. 3b shows an enlarged side view of the lifting yoke according to FIG. 3a, FIG. 4 is a perspective view of a step in the method according to an embodiment of the invention, where the wind turbine rotor blade has been detached from the rotor hub, FIG. 9 is a side view of a lifting yoke according to an aspect of the invention, FIG. 10a shows a detailed view of an exit sheave according to the invention, FIG. 10b shows another detailed view of the exit sheave according to the invention.

DETAILED DESCRIPTION OF THE INVENTION

Figure 1:
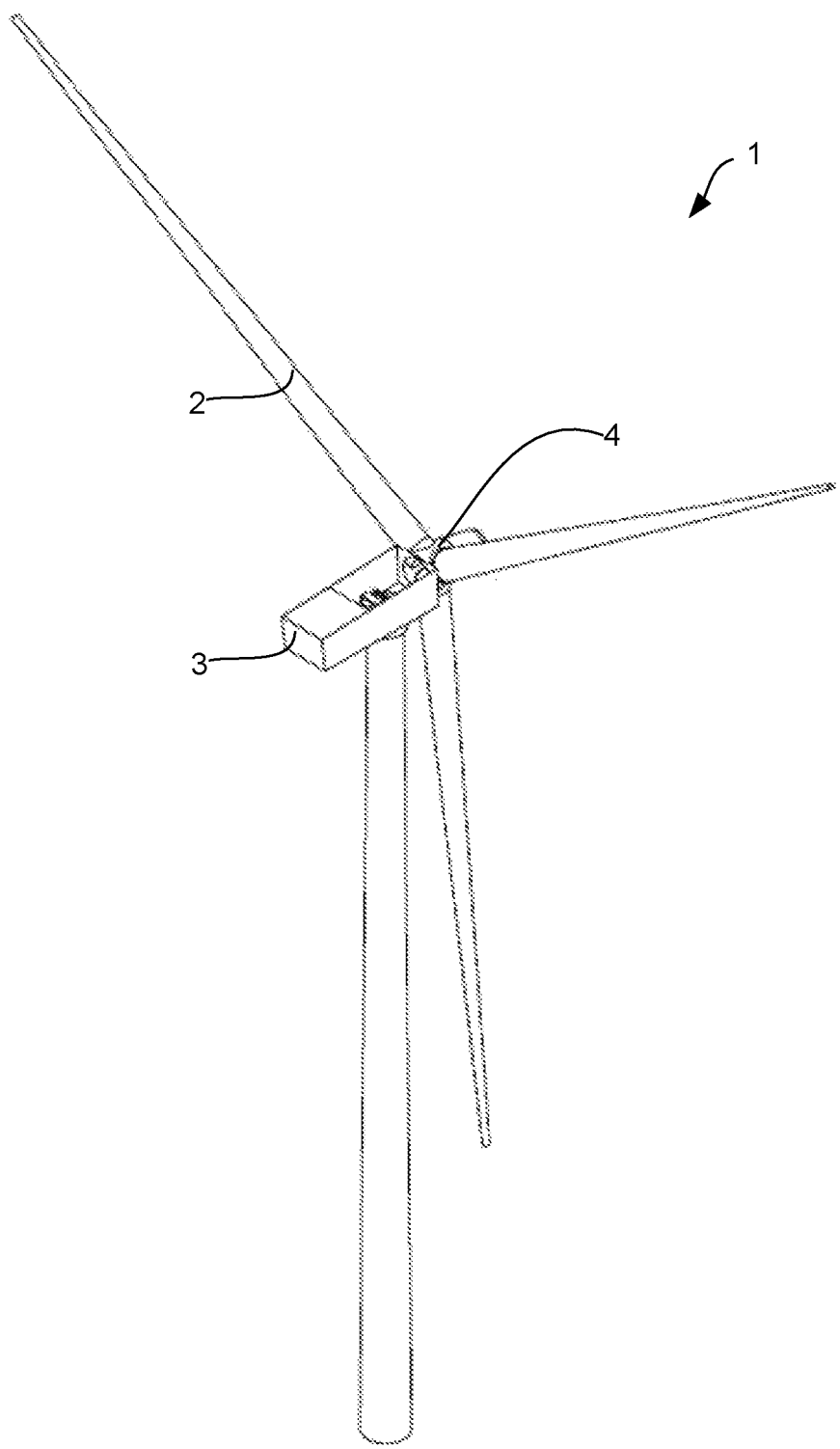
FIG. 1 is a perspective view of a wind turbine according to prior art.

FIG. 1 shows a known wind turbine 1. Such a wind turbine 1 has a tower, a nacelle 3 and a rotor hub 4, onto which in the operational configuration of the wind turbine has three wind turbine rotor blades 2. When installing or uninstalling the wind turbine rotor blades 2, one method comprises installing a single wind turbine rotor blade 2 in a substantially vertical position pointing towards the ground.

Figure 2A:
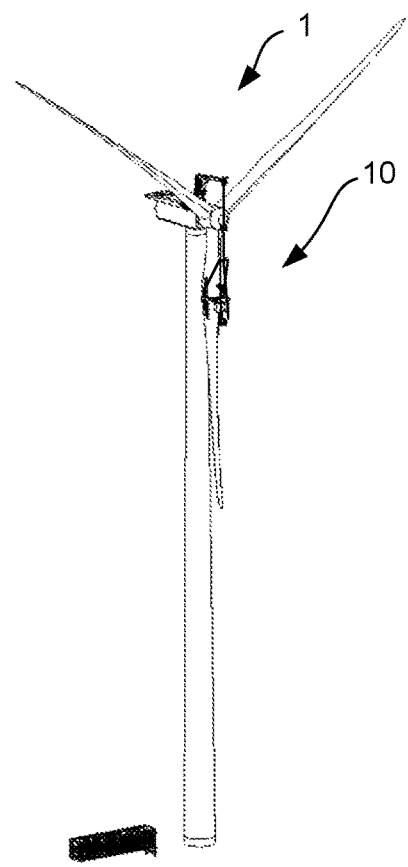
FIG. 2a is a perspective view of a lifting yoke according to an embodiment of the invention, which is being lifted into position holding a turbine blade to use the method according to an embodiment of the invention.
Figure 2B:
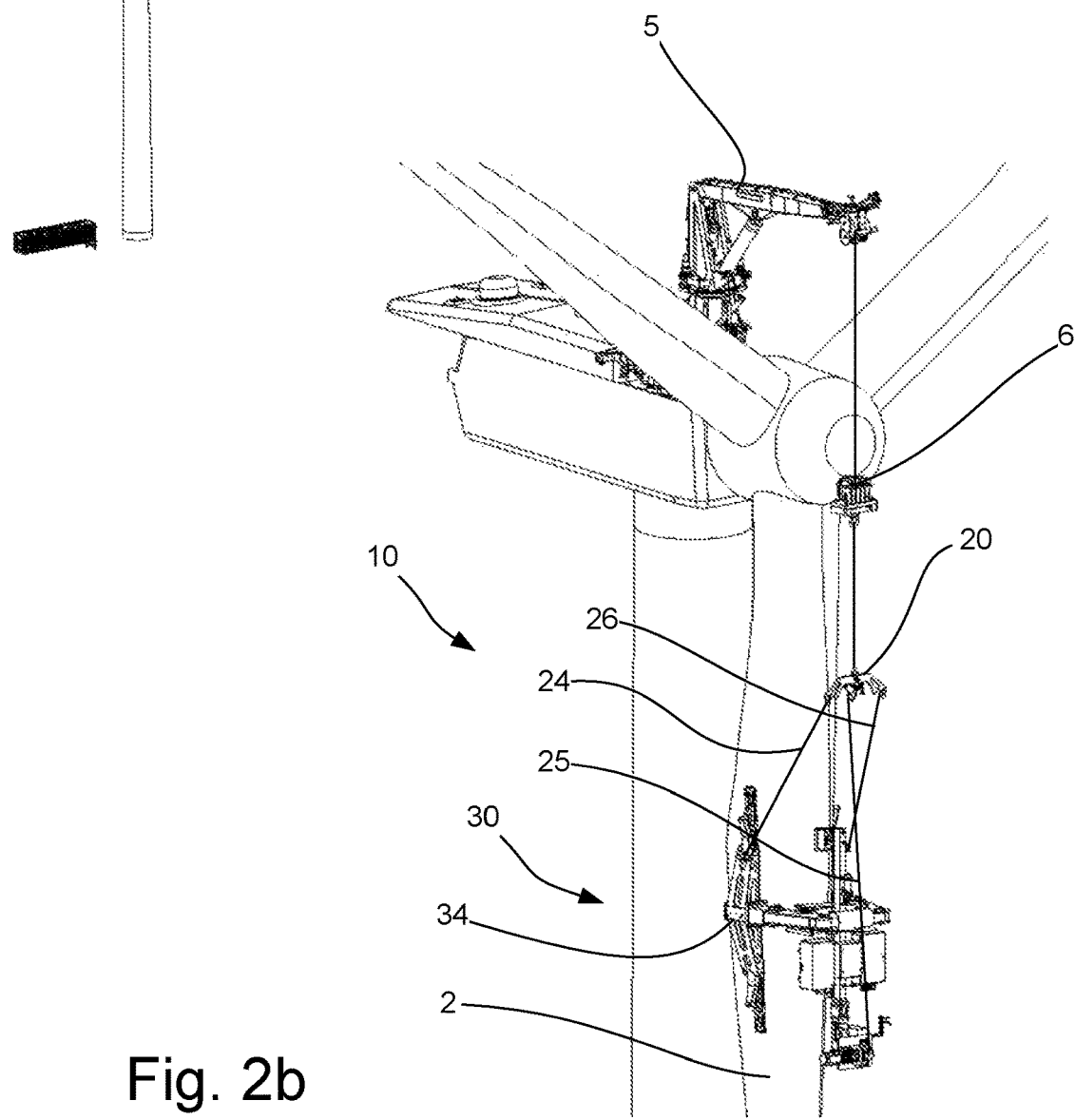
FIG. 2b shows an enlarged view of the lifting yoke according to the invention.

Such an uninstallation process is shown in FIGS. 2a-8, using a lifting yoke 10 and method according to an embodiment of the inventive concept of this application. FIG. 2a shows a wind turbine 1 where a crane 5 has been mounted in the nacelle 4 and where the crane 5 has a crane hook 6, which holds a lifting yoke 10 according to the invention. FIG. 2b shows the lifting yoke 10 being positioned to attach to the wind turbine rotor blade 2, which is to be uninstalled. The crane hook 6 is connected to a first structural body 20 of the lifting yoke 10. The first structural body 20 is connected to a second structural body 30 by a first tensional element 24, a second structural element 25 and a third structural element 26. As seen in FIGS. 3a and 3b the second structural element 30 has been positioned relative to the wind turbine rotor blade 2, and a hydraulic actuator actuates structural parts of the second structural body 30, such that clamping pads 34 attached to the second structural body 30 press against the wind turbine rotor blade 2 such as to hold the blade in a frictional connection.

As seen in FIG. 3b the crane hook 6 is connected to the crane hook connection point 21 of the first structural body 20 by a crane hook sling 8. The crane hook connection point 21 is in this embodiment a shackle. The spreader beam shaped first structural element 20 further has a first connection point 22, a second connection point 23 and a sixth connection point 27, each of which are connected to a third connection point 31, fourth connection point 32 and fifth connection point 33, respectively, of the second structural body 30. Thus, the first connection point 22 is connected to the third connection point 31 by a first tensional element 24 and the sixth connection point 27 is connected to the fifth connection point 33 by a third tensional element 26, both of which tensional elements in the shown embodiment are fixed length tensional elements, such as a steel wire or a sling. Further the second connection point 23 is connected to the fourth connection point 32 by a second tensional element 25, which can be varied in length. In this embodiment the second tensional element 25 is a steel wire, which can be varied in length by winding or unwinding a winch, onto which the second tensional element 25 is attached.

The lifting yoke 10, further comprises an inertial measurement unit 40, which is fixed to the second structural body 30 and which measures the angular orientation of the second structural body 30 with respect to a horizontal plane.

Figure 4:
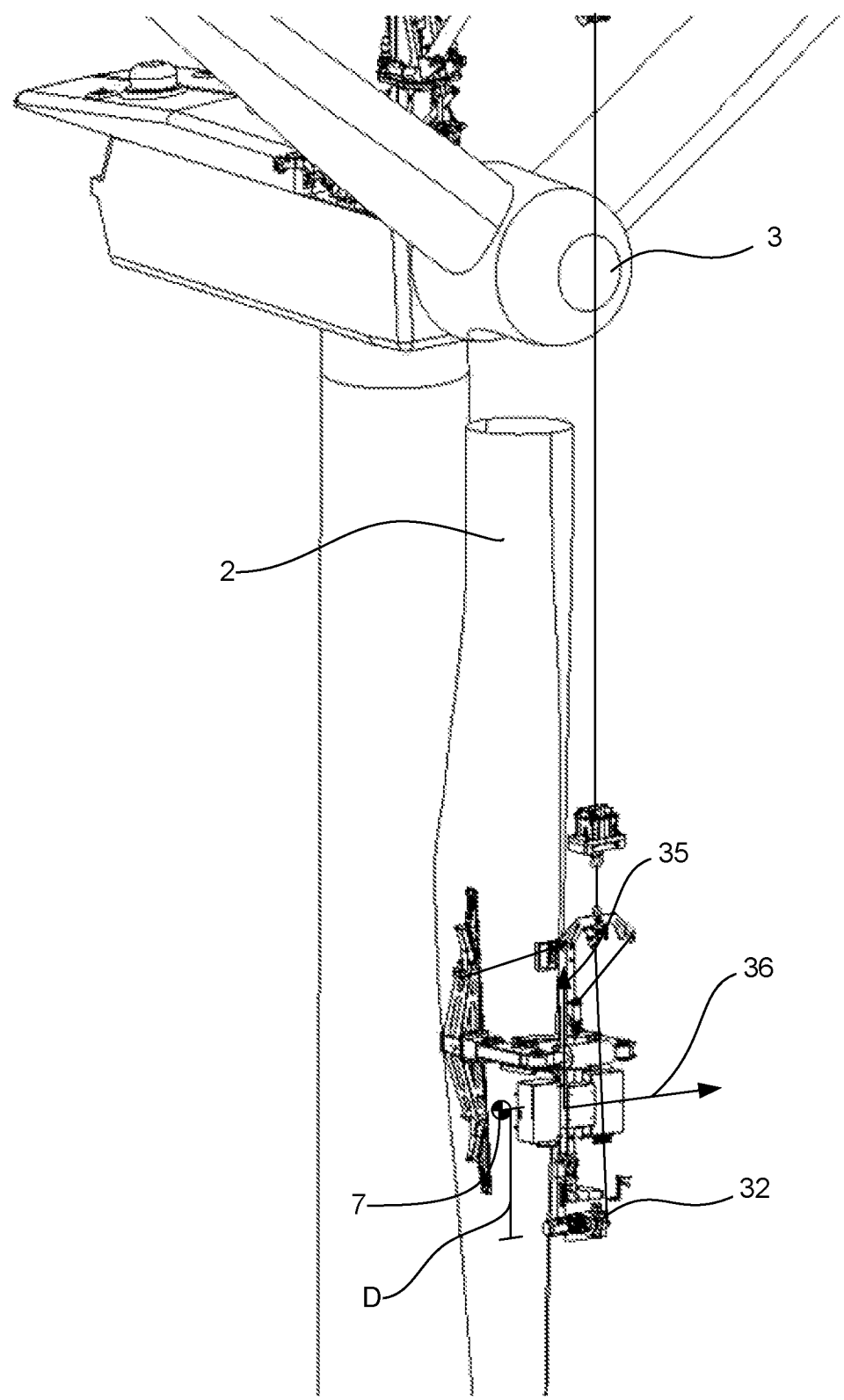

Once the clamping pads 34 of the second structural unit 20 have clamped on to the wind turbine rotor blade 2, the wind turbine rotor blade 2 can be detached from the rotor hub 3, typically by unfastening a number of bolts from the interior of the rotor hub 3. After having detached the wind turbine rotor blade 2 from the rotor hub 3 the entire weight of the wind turbine rotor blade 2 is held in the lifting yoke 10, as seen in FIG. 4. From here the position of the center of gravity 7 of the wind turbine rotor blade 2 can be calculated relative to the second structural body 30. In this embodiment the position of the center of gravity 7 relative to the second structural body 30 is calculated as the distance D along a first axis 35 from the fourth connection point 32. In the figures, the positions of the wind turbine rotor blade 2, crane hook 6 and lifting yoke 10 have been exaggerated to enable showing the features and varying angles. In a physical setup the angles will likely be more compact. However, in a real application, the center of gravity 7 of the wind turbine rotor blade 2 will always be positioned on a vertical line below the crane hook 6.

Figure 12:
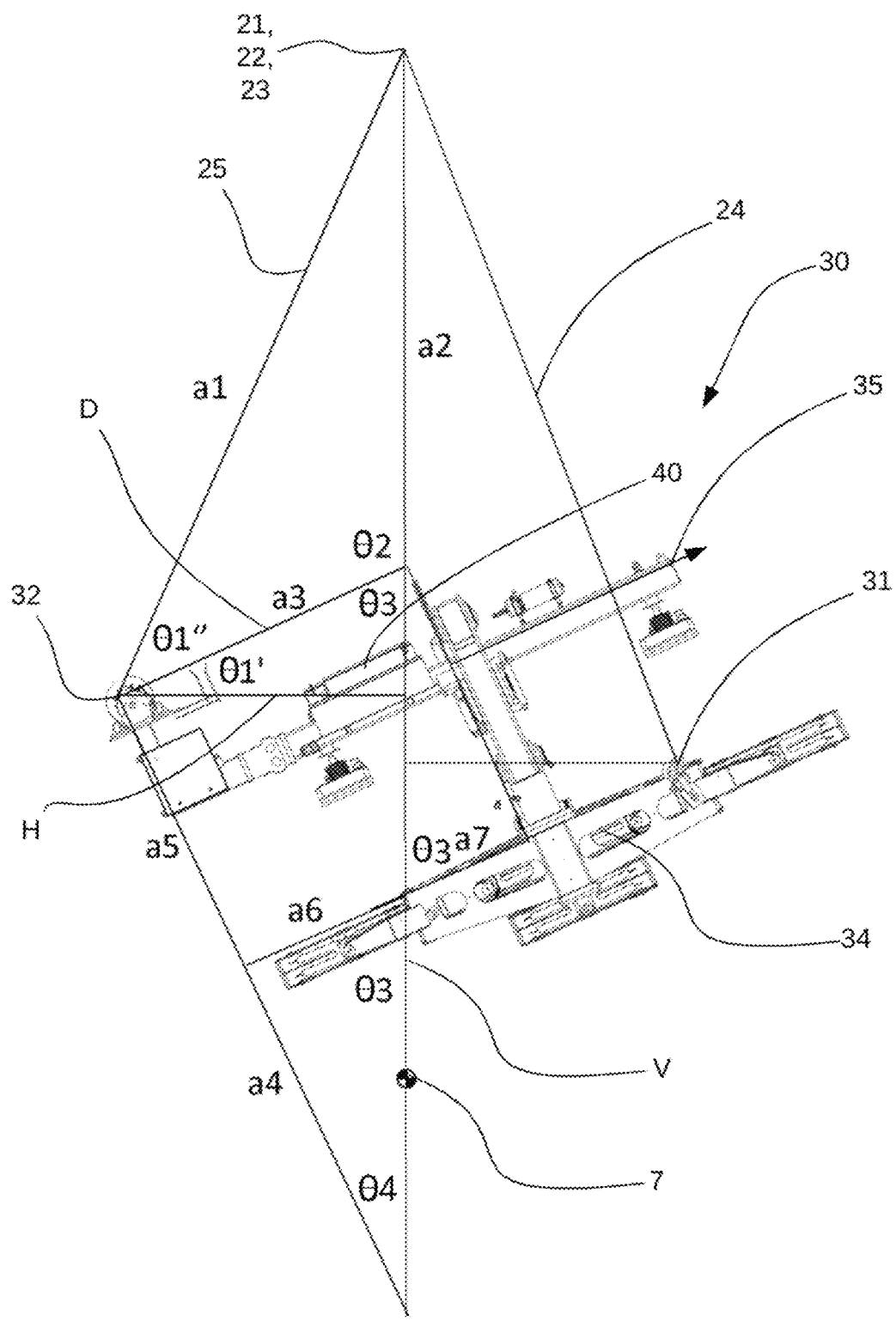
FIG. 12 is a side view of a lifting yoke according to the invention, which details the geometric relations in the invention.

An example of this is shown in FIG. 12 where a part of a lifting yoke 10 is seen. Here the center of gravity 7 of a wind turbine rotor blade 2 (not shown) is placed on a vertical V line below the crane hook connection point 21. The inertial measurement unit 40 measures the angle of rotation θ1' of the second structural body 30 relative to the horizontal direction H. Further in this embodiment the fourth connection point 32 is in the form of a winch, which is connected to the second structural body 30 by a directional load pin, which measures two components of force acting on the pin, one of which is the force component in the direction of the first axis 35, and the second force component is measured in a direction perpendicular to both the first 35 and second axis 36. By using the trigonometric relation between the opposite leg and adjacent leg of a right-angled triangle, the angle θ1' between the first axis 35 and the second tensional element 25 can be calculated. An encoder in the winch measures the length of wire a1 between the second connection point 23 and the fourth connection point 32. Using the following trigonometric equation, the distance D, along the direction of the first axis 35, between the fourth connection point 32 and the vertical line extending through the crane hook connection point 21 and the center of gravity 7 of the wind turbine rotor blade can be calculated:

a)

$$D = a3 = a1 \cdot \frac{\cos(\theta 1' + \theta 1'')}{\sin(\theta 1')}$$

By calculating this distance D and combining with the knowledge of similar triangle geometry (e.g., in a right angled triangle, such as the one containing θ1' and θ3, all other triangles consisting of either the horizontal line H or the vertical line V, a line that is perpendicular to the line a3 and which contains one right angle, said triangle will have the same angles as the original right angled triangle containing θ1' and θ3) and a number of other known or pre-determined distances on the lifting yoke 10, the distance a7, which the lifting yoke 10 needs to be moved relative to the wind turbine rotor blade 2 in order to position the center of gravity 7 in the desired location relative to the second structural body 30, can be determined.

Figure 5:
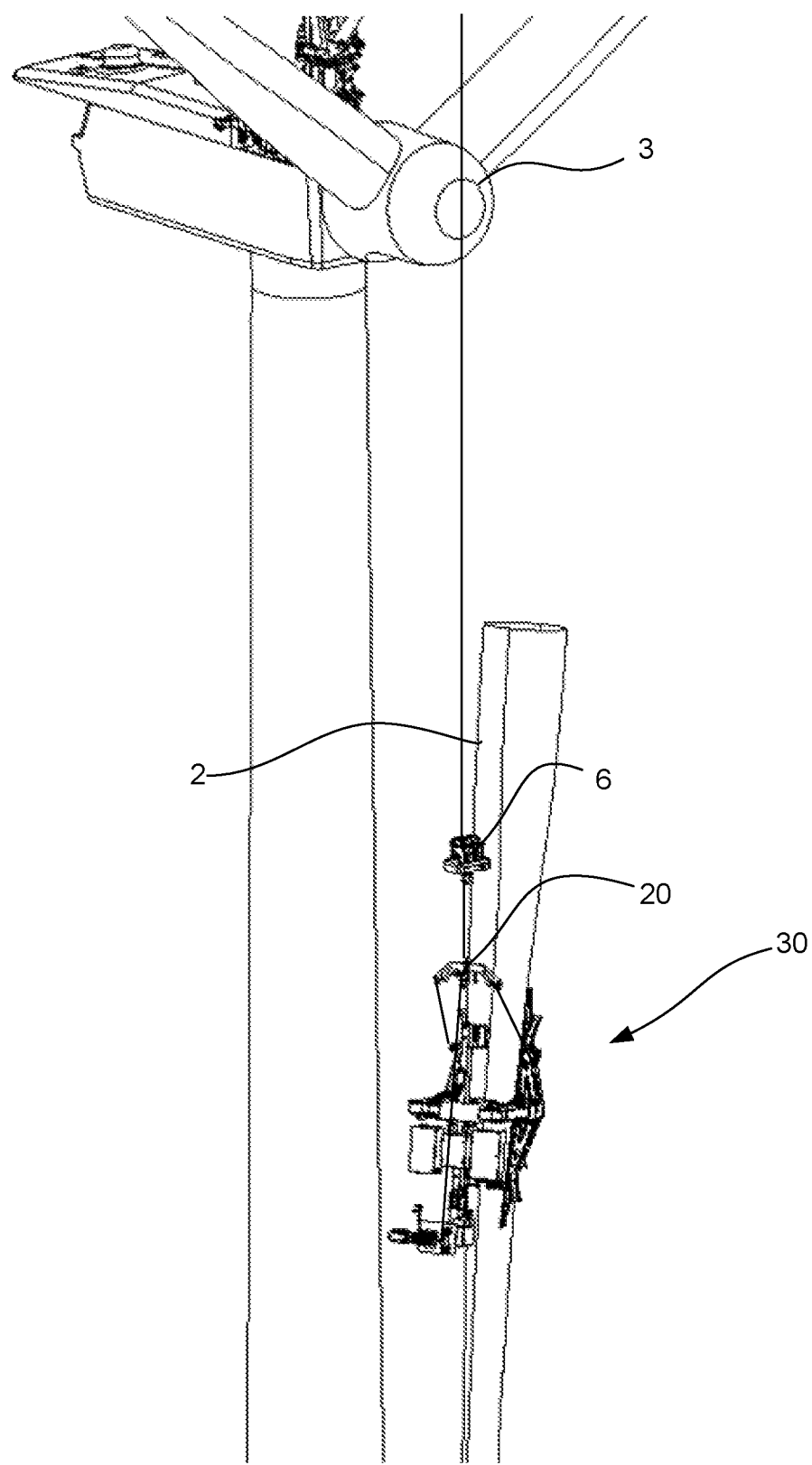
FIG. 5 is a perspective view of a step in the method according to an embodiment of the invention, where the wind turbine rotor blade has been lowered a distance from the rotor hub.

If the position of the center of gravity 7 is within a pre-determined range, the crane hook will be lowered further, as seen on FIG. 5.

Figure 6:
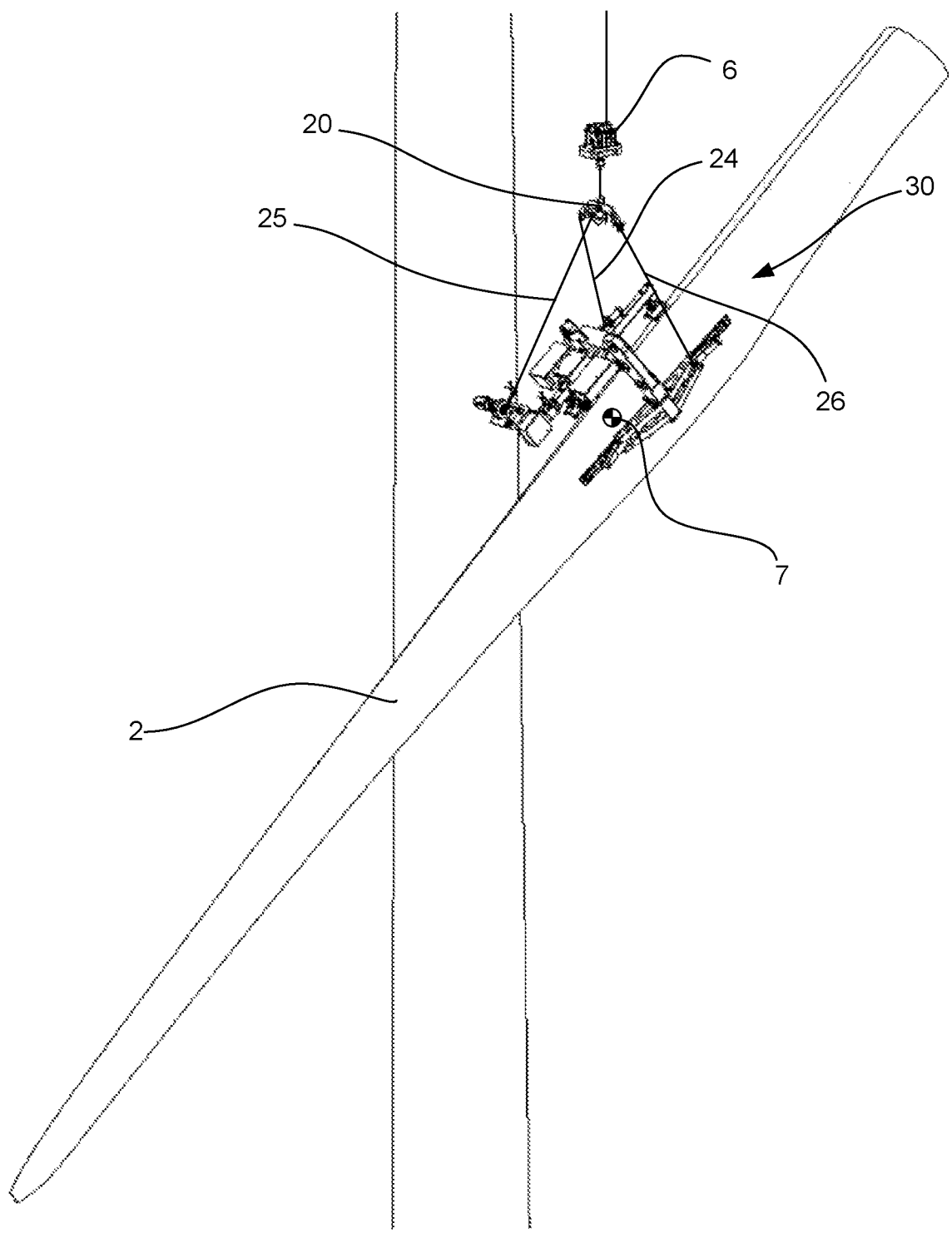
FIG. 6 is a perspective view of a wind turbine rotor blade being rotated in the lifting yoke according to an aspect of the invention.

Once the wind turbine rotor blade 2 has been lowered enough to safely rotate it to a substantially horizontal position, the winch 32 connected to the second tensional element 25 will wind up, such that the length of the wire 25 between the second connection point 23 and the fourth connection point 32 decreases. As seen in FIG. 6, this will result in rotation of the second structural body 30 and the wind turbine rotor blade 2 held therein. Since the center of gravity 7 of the wind turbine rotor blade 2 will always be positioned vertically below the crane hook 6, the forces acting on the first 24, second 25 and third tensional elements 26 will change depending on the relative position of the center of gravity 7 of the wind turbine rotor blade 2 in the second structural body 30. If the center of gravity 7 of the wind turbine rotor blade 2 is closer to the end where the fourth connection point 32 is located, the second tensional element 25 will carry a substantially large part of the load. Likewise, the second structural body 30 will be loaded unfavorably if the position of the center of gravity 7 of the wind turbine rotor blade 2 is shifted too far to either side. In order to weight optimize the lifting yoke 10, it is for this reason that it is particularly advantageous to use the method according to the invention to lift a wind turbine rotor blade 2.

Figure 7:
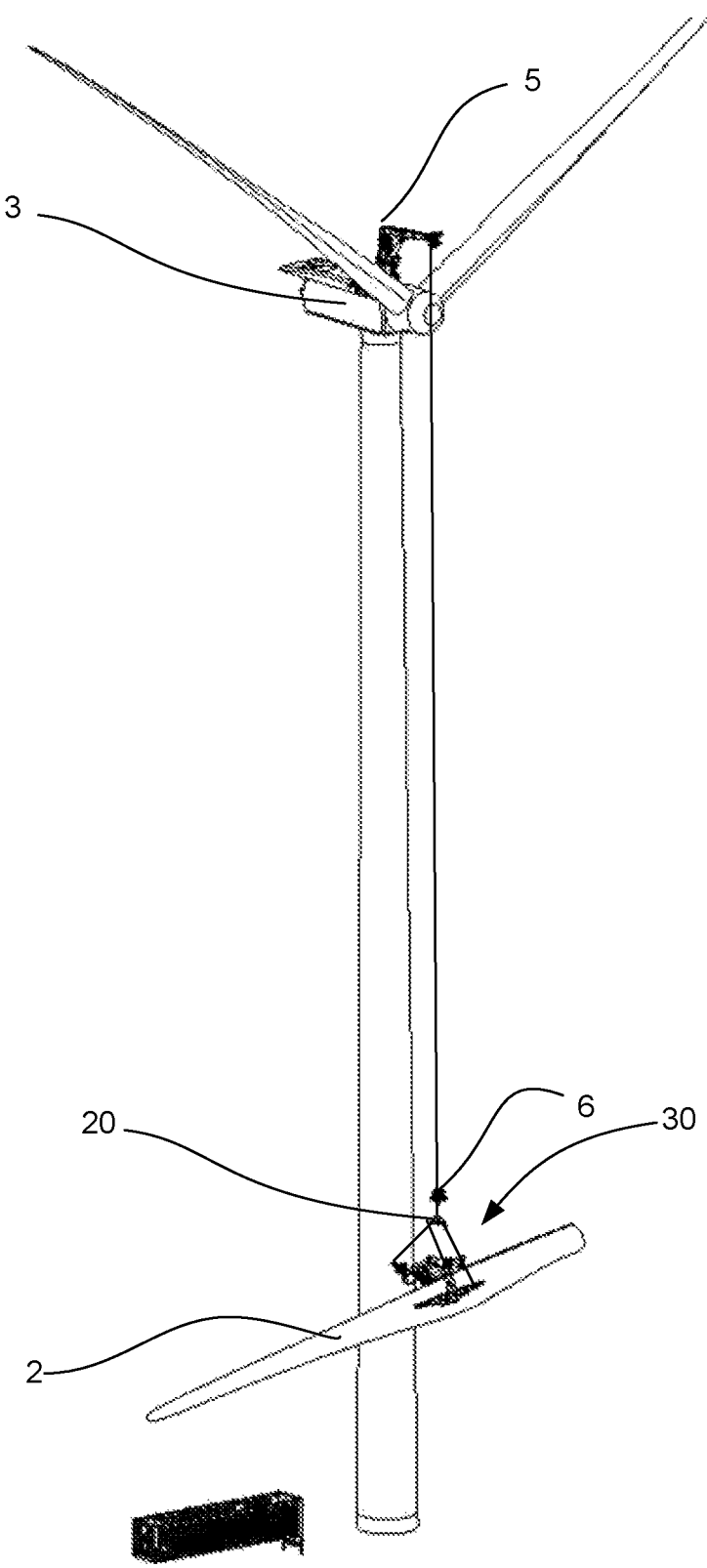
FIG. 7 is a perspective view of a wind turbine rotor blade that has been rotated in the lifting yoke and lowered almost to the ground according to an aspect of the invention.
Figure 8:
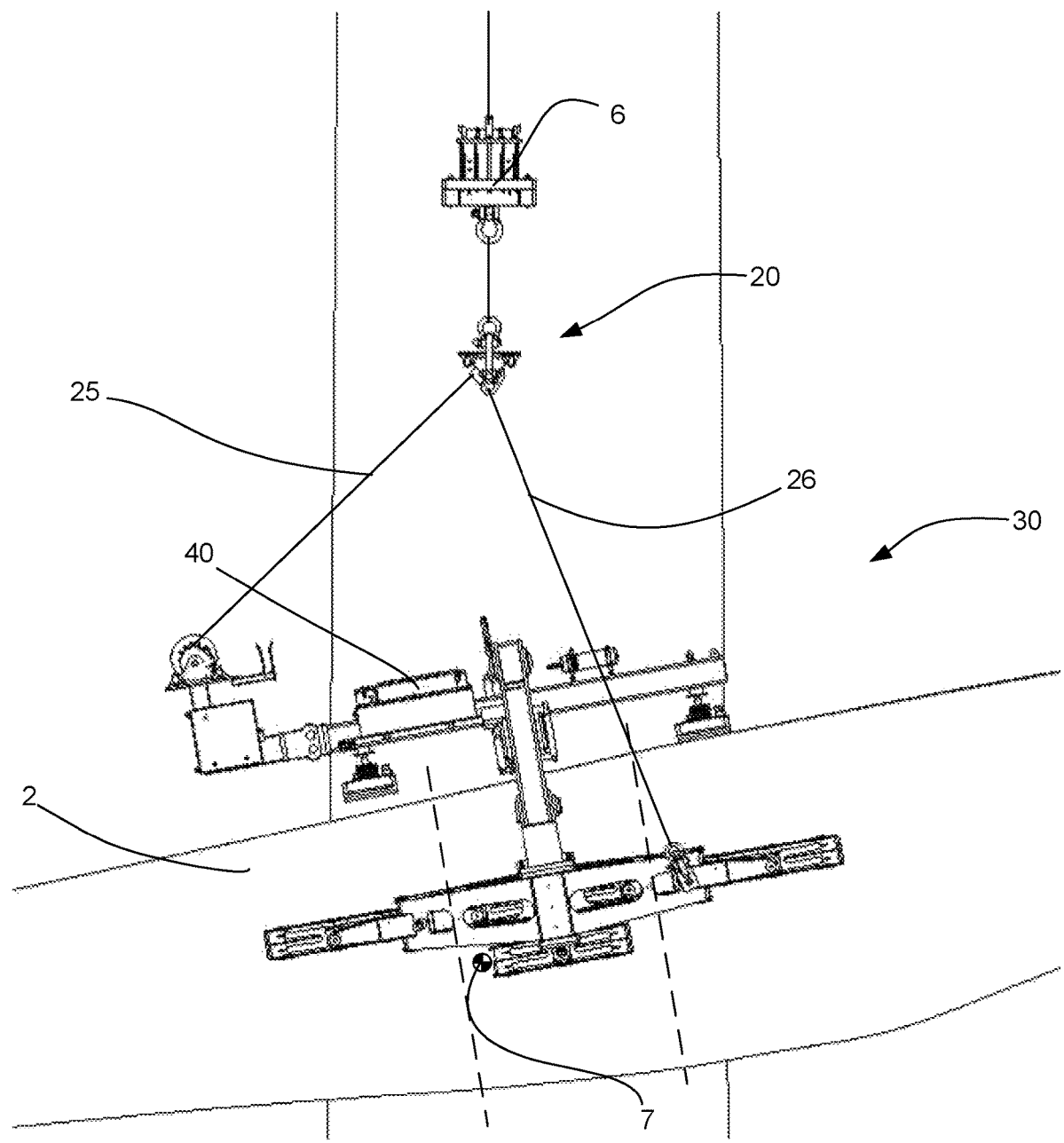
FIG. 8 shows an enlarged side view of the lifting yoke according to FIG. 7.

As seen in FIG. 7 the wind turbine rotor blade 2 has been rotated to has been rotated to a substantially horizontal position, which is the position in which it will be placed on the ground or a truck bed for transportation. As seen in FIG. 8, the center of gravity 7 of the wind turbine rotor blade 2 is within the pre-determined range (marked with dashed lines), wherein the lifting yoke 10 has been designed to handle the loading.

FIGS. 9-11b show details of the second structural body 30 of the lifting yoke 10. As seen in FIG. 9, the second structural body 30 comprises a main beam 37, which is the primary load carrying structure, and which has a longitudinal direction in this embodiment that also defines the first axis 35. A pair of clamping arms 38 are actuatably connected to the main beam 37. When the hydraulic actuator is activated, the clamping arms will either move closer to each other or away, such as to enable clamping on to the wind turbine rotor blade 2. This clamping is effectuated by a number of clamping pads 34, equally distributed on each clamping arm 37, which are specially designed to distribute the clamping force over the surface of the wind turbine rotor blade 2. On the clamp pads 34 both a third 31 and fifth 33 connection point are located, one on the clamp pads 34 of each clamping arm 37. These connection points are connected to the first 22 and sixth 27 connection points of the first structural body 20 by means of a sling or wire. On the main beam 37 the second structural body 30 further comprises an inertial measurement unit 40, which in this embodiment provides three-dimensional rotation information, such that the angle of the main beam 37 is measured about three axes. At an end of the main beam 37 a fixture for the fourth connection point 32 is placed. In this embodiment, the fourth connection point 32 is coincident with a rotational axis of an exit sheave 50. Next to the exit sheave 50 a winch 55 is located, the function of which is to wind an unwind the second tensional element 25, in this embodiment a steel wire, in order to vary the length between the second connection point 23 and the fourth connection point 32.

In FIG. 10*a* a detailed view of the exit sheave 50 is shown. The exit sheave 50 has a wire guide section 51, which functions to ensure the wire exits the sheave in the correct angle, and that when the angles change, the wire will stay in the groove of the sheave. However, for the use of the lifting method according to the invention, an angle sensor, such as a potentiometer, attached to the wire guide section 51 of the exit sheave 50 will provide a measurement of the angle between the second tensional element 25 and the first axis 35 of the lifting plane.

Figure 11A:
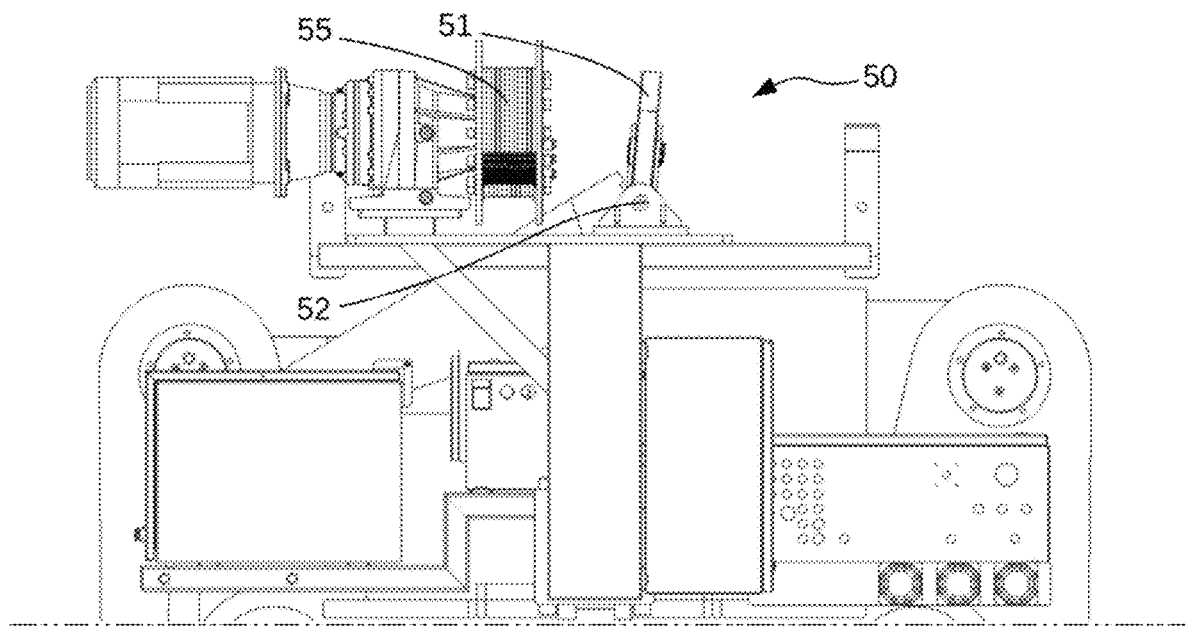
FIG. 11a is an elevational view of exit sheave from another direction.
Figure 11B:
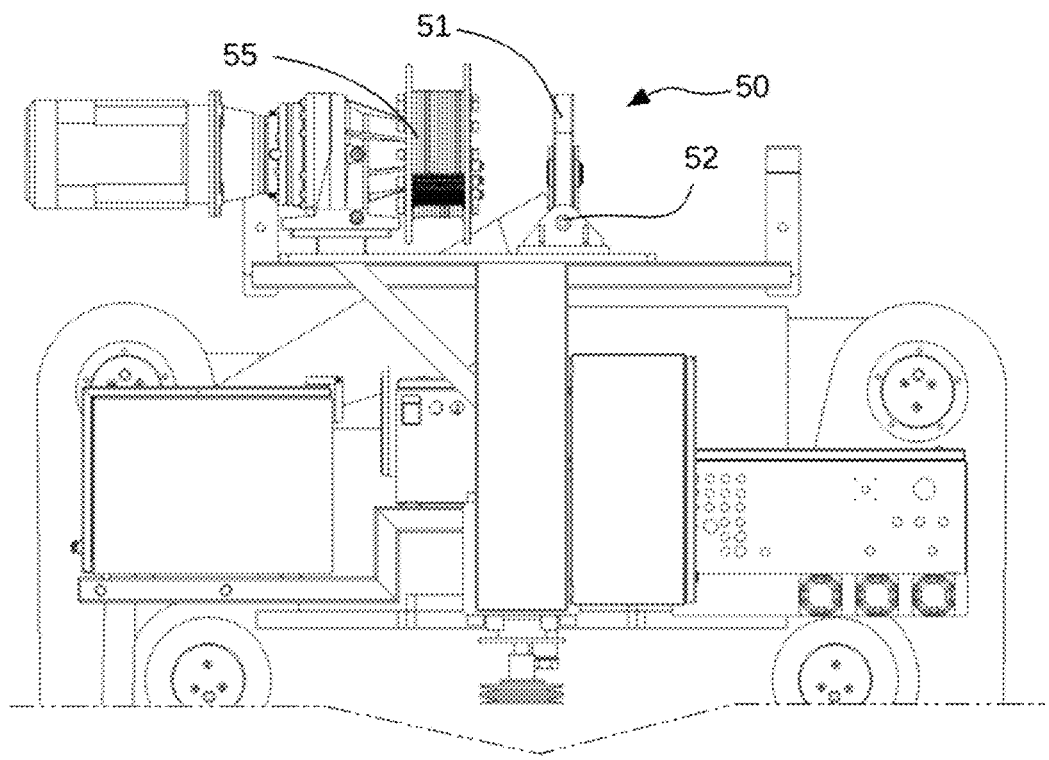
FIG. 11b shows another elevational view from of the exit sheave according to the invention.

In FIG. 10*b*, the angle of the wire guide 51 section of the exit sheave 50 has been changed. In a similar manner, the exit sheave 50 has a second sheave rotation axis 52, which is parallel to the first axis 35, which allows for compensation for rotation of the second structural body 30 about an axis parallel to the first axis 35. In FIGS. 11*a* and 11*b* a rotation about such an axis is shown, and the exit sheave 50 is rotated about the sheave rotation axis 52. By attaching an angle sensor, such as a potentiometer, between second structural body 30 and the sheave rotation axis 52 of the exit sheave 50 will provide a measurement of the angle between the second tensional element 25 and the second axis 36 of the lifting plane. As further seen on FIGS. 11*a* and 11*b* is the winch 55, which will wind and unwind the wire 25.

The person skilled in the art realizes that the present invention by no means is limited to the preferred embodiments described above. On the contrary, many modifications and variations are possible within the scope of the appended claims.

LIST OF REFERENCE NUMBERS

D Distance
1 wind turbine
2 wind turbine rotor blade
3 wind turbine nacelle
4 wind turbine rotor hub
5 crane
6 crane hook
7 center of gravity
8 crane hook sling
10 lifting yoke
20 first structural body
21 crane hook connection point
22 first connection point
23 second connection point
24 first tensional element
25 second tensional element
26 third tensional element
27 sixth connection point
30 second structural body
31 third connection point
32 fourth connection point
33 fifth connection point
34 clamp pads
35 first axis
36 second axis
37 main beam
38 clamping arms
40 inertial measurement unit
50 exit sheave
51 wire guide
52 sheave rotation axis
55 winch

What is claimed is:

1. A wind turbine rotor blade lifting yoke for lifting a wind turbine rotor blade, the lifting yoke comprising:
   a first structural body comprising a crane hook connection point configured to attach to a hook of a crane,
   a second structural body located at a distance from the first structural body,
   a first tensional element connecting a first connection point of the first structural body and a third connection point of the second structural body,
   a second tensional element connecting a second connection point of the first structural body and a fourth connection point of the second structural body, and wherein a length of the second tensional element is variable, such that an angle between the first and second structural bodies can be changed by changing the length of the second tensional element,
   an inertial measurement unit positioned on the second structural body, wherein the inertial measurement unit measures the angle of rotation of the second structural body about at least one axis with respect to a horizontal and/or vertical direction,
   a first sensor, which measures information for calculating the length of the second tensional element,
   a second sensor for measuring information for calculating an angle of the second tensional element with respect to the second structural body,
   a control system receiving measurements from the sensors and calculating a center of gravity of the wind turbine rotor blade.

2. The wind turbine rotor blade lifting yoke for lifting a wind turbine rotor blade according to claim 1, wherein the second sensor is a load pin which measures force in the fourth connection point in at least two directions that are not parallel to each other, and wherein the angle of the second tensional element with respect to the second structural body is calculatable by a two force vector provided by the load pin.

3. A method for lifting a wind turbine component using a lifting yoke, the lifting yoke comprising:
   a first structural body comprising a crane hook attachment point, a first connection point and a second connection point,
   a second structural body comprising a third connection point and a fourth connection point, the second structural body further comprising a first axis defined as being parallel to a longitudinal direction of the second structural body, a second axis defined as being perpendicular to the first axis and extending substantially in a transverse direction of the second structural body, the first axis and second axis defining a lifting plane, and a third axis defined as being perpendicular to the first axis and the second axis,
a first tensional element connecting the first connection point and the third connection point,
a second tensional element connecting the second connection point and the fourth connection point, wherein a length of the second tensional element is variable, such that an angle between the first and second structural bodies can be changed by changing the length of the second tensional element, and
an inertial measurement unit positioned on the second structural body,
wherein the method comprises:
a) attaching a crane hook to the crane hook attachment point,
b) attaching the wind turbine component to the second structural body of the lifting yoke,
c) measuring at least one angle of rotation of the lifting plane about at least one of the first and/or second axis with respect to a horizontal plane using the inertial measurement unit,
d) determining a distance, along at least one axis in the lifting plane perpendicular to the first and/or second axis about which the angle of rotation of the lifting plane, from the fourth connection point on the second structural body to an intersection between an axis extending vertically through a center of gravity of the wind turbine component and the lifting plane, and
e) providing the distance determined, along at least one axis in the lifting plane perpendicular to the first and/or second axis about which the angle of rotation of the lifting plane, from the fourth connection point on the second structural body to the intersection between an axis extending vertically through the center of gravity of the wind turbine component and the lifting plane to a crane operator.

4. The method for lifting a wind turbine component according to claim 3, wherein the method further comprises:
c') determining a tension in the second tensional element, and
c'') comparing information regarding the at least one angle of rotation of the lifting plane and the tension in the second tensional element to a pre-configured look-up table, wherein the pre-configured look-up table contains information regarding the distance, along an axis in the lifting plane perpendicular to the axis about which the angle of rotation of the lifting plane was measured, from the fourth connection point on the second structural body to the intersection between an axis extending vertically through the center of gravity of the wind turbine component and the lifting plane for a plurality of sets of at least one angle of rotation of the lifting plane and tension in the second tensional element.

5. The method for lifting a wind turbine component according to claim 4, wherein the method further comprises:
d') determining the angle between the second tensional element and the first axis of the second structural body, and
d'') determining the length of the second tensional element between the second connection point and the fourth connection point,
using the angle between the second tensional element and the first axis of the second structural body and the length of the second tensional element between the second connection point and the fourth connection point for determining the distance along the first axis of the second structural body from a point on the lifting yoke to the center of gravity of the wind turbine component.

6. The method for lifting a wind turbine component according to claim 5, wherein determining the angle between the second tensional element and the first axis of the second structural body further comprises:
measuring a first force component in the second tensional element, the first force component having a predetermined direction with relation to the lifting plane,
measuring a second force component in the second tensional element, the second force component having a predetermined direction with relation to the lifting plane, in which the direction of the second force component is not parallel with the predetermined direction of the first force component,
calculating a directional vector from a size of the first and second force components, and
calculating the angle between the directional vector and the first axis of the second structural body.

7. The method for lifting a wind turbine component according to claim 5, wherein determining the angle between the second tensional element and the first axis of the second structural body further comprises:
measuring the angle of an exit sheave axis of an exit sheave, the exit sheave being connected to the second tensional element in a position between the second connection point and the fourth connection point, wherein the exit sheave is connected to the second structural body and wherein the exit sheave axis is parallel with the second tensional element between the second connection point and the fourth connection point.

8. The method for lifting a wind turbine component according to claim 5, wherein the method further comprises:
adding the information about the angle of rotation of the second structural body about at least the second axis and the angle between the second tensional element and the first axis of the second structural body,
d'''') determining a horizontal distance from the second connection point of the second structural body to a point on the wind turbine component intersecting with a vertical axis extending from the second connection point of the first structural body, and
using the information about the angle of rotation of the second structural body about at least the second axis to determine the distance along at least the first axis of the second structural body from the second connection point of the second structural body to the point on the wind turbine component intersecting with a vertical axis extending from the second connection point of the first structural body.

9. The method lifting a wind turbine component according to claim 8, wherein the method further comprises, during step d):
using information about a predetermined horizontal distance from the crane hook attachment point to the second connection point of the first structural body to determine an offset value in the direction along the first axis of the second structural body,
adding the offset value to the horizontal distance determined, and
using the information about the angle of rotation of the second structural body about at least the second axis to determine the distance along at least the first axis of the second structural body from the second connection point of the second structural body to the point on the wind turbine component intersecting with a vertical axis extending from the second connection point of the first structural body.

10. The method for lifting a wind turbine component according to claim 3, wherein the method further comprises holding the second structural body in a first position, during steps c) to d), and wherein, after providing information to the crane operator in step e), the method further comprises a step f) wherein the second structural body is moved to a second position, by changing the length of the second tensional element, and lowering or raising the crane hook.

11. The method for lifting a wind turbine component according to claim 10, wherein
if the at least one distance provided in step e) is outside a pre-determined range, the second structural body is either repositioned relative to the wind turbine component after step e), or
if the at least one distance provided in step e) is within the pre-determined range, then step f) is performed.

12. The method for lifting a wind turbine component according to claim 3, wherein the method further comprises:
using an inertial measurement unit positioned on the second structural body for measuring the angle of rotation of the second structural body about at least one axis with respect to a horizontal and/or vertical direction,
using a first sensor to obtain measuring information for calculating the length of the second tensional element, the first sensor being one of an encoder, a positional transducer, or a hall effect sensor system,
using a second sensor to obtain measuring information for calculating an angle of the second tensional element with respect to the second structural body, and
providing measurements of the sensors to a control system for calculating the center of gravity of the wind turbine component.

13. The method for lifting a wind turbine component according to claim 3, wherein the wind turbine component is a rotor blade.

14. The method for lifting a wind turbine component according to claim 3, wherein the wind turbine component is a gearbox.

15. The method for lifting a wind turbine component according to claim 3, wherein the wind turbine component is a rotor.

16. The method for lifting a wind turbine component according to claim 3, wherein the first tensional element is a sling.

17. The method for lifting a wind turbine component according to claim 3, wherein the first tensional element is a wire.

18. The method for lifting a wind turbine component according to claim 3, wherein the second tensional element is a sling.

19. The method for lifting a wind turbine component according to claim 3, wherein the second tensional element is a wire.

* * * * *